(12) United States Patent
Jung et al.

(10) Patent No.: US 9,389,467 B2
(45) Date of Patent: Jul. 12, 2016

(54) LIQUID CRYSTAL DISPLAY

(71) Applicant: Samsung Display Co., Ltd., Yongin, Gyeonggi-Do (KR)

(72) Inventors: Min-Sik Jung, Seoul (KR); Byung-Chul Kim, Goyang-si (KR); Young Gu Kim, Hwaseong-si (KR); Hwa Sung Woo, Asan-si (KR); Baek Kyun Jeon, Yongin-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 50 days.

(21) Appl. No.: 14/307,660

(22) Filed: Jun. 18, 2014

(65) Prior Publication Data
US 2015/0098041 A1 Apr. 9, 2015

(30) Foreign Application Priority Data
Oct. 7, 2013 (KR) .................. 10-2013-0119422

(51) Int. Cl.
*G02F 1/1339* (2006.01)
(52) U.S. Cl.
CPC .................................. *G02F 1/13394* (2013.01)
(58) Field of Classification Search
CPC .................................................. G02F 1/13394
See application file for complete search history.

(56) References Cited

U.S. PATENT DOCUMENTS

| | | | |
|---|---|---|---|
| 7,636,147 B2 | 12/2009 | Lee | |
| 7,684,003 B2 | 3/2010 | Paik et al. | |
| 7,999,903 B2 | 8/2011 | Nakayama et al. | |
| 2005/0088606 A1* | 4/2005 | Ashizawa et al. | 349/156 |
| 2008/0123043 A1* | 5/2008 | Li et al. | 349/156 |
| 2009/0115954 A1* | 5/2009 | Tseng et al. | 349/156 |
| 2009/0180043 A1* | 7/2009 | Rho et al. | 349/12 |
| 2010/0165278 A1* | 7/2010 | Matsumori et al. | 349/123 |
| 2010/0201933 A1 | 8/2010 | Sonoda et al. | |
| 2012/0086901 A1* | 4/2012 | Nakagawa et al. | 349/155 |
| 2012/0268702 A1 | 10/2012 | Imanishi et al. | |
| 2012/0314177 A1 | 12/2012 | Hyodo et al. | |
| 2014/0028954 A1* | 1/2014 | Shibazaki | 349/64 |
| 2015/0098041 A1* | 4/2015 | Jung et al. | 349/46 |

FOREIGN PATENT DOCUMENTS

| | | |
|---|---|---|
| JP | 4266057 B2 | 2/2009 |
| JP | 2009282262 A | 12/2009 |
| KR | 100672651 B1 | 1/2007 |
| KR | 1020080079141 A | 8/2008 |

* cited by examiner

*Primary Examiner* — Timothy L Rude
(74) *Attorney, Agent, or Firm* — Cantor Colburn LLP

(57) ABSTRACT

A liquid crystal display includes a first substrate, a second substrate facing the first substrate with a predetermined interval therebetween, a liquid crystal material filled between the first substrate and the second substrate, a column spacer disposed at the second substrate and maintaining the predetermined interval between the first substrate and the second substrate, a passivation layer disposed at the first substrate, a pixel electrode disposed on the passivation layer; and a fixing protrusion which is disposed on the first substrate, is positioned at an opposing surface of the column spacer and includes at least one of a lower layer including the passivation layer and an upper layer including the pixel electrode.

19 Claims, 18 Drawing Sheets

LIQUID CRYSTAL DISPLAY

This application claims priority to Korean Patent Application No. 10-2013-0119422 filed on Oct. 7, 2013, and all the benefits accruing therefrom under 35 U.S.C. §119, the entire contents of which are incorporated herein by reference.

BACKGROUND (a) Field

The invention relates to a liquid crystal display ("LCD"), and in detail, relates to an LCD including two display panels, a spacer supporting the two display panels, and a fixing protrusion fixing the spacer.

(b) Description of the Related Art

A liquid crystal display ("LCD") is one of widely used flat panel displays. An LCD is a display device including two display panels provided with field generating electrodes, a liquid crystal layer disposed therebetween, and a substrate spacer uniformly supporting an interval between the two display panels. Liquid crystal molecules of a liquid crystal layer are rearranged by applying voltages to the field-generating electrodes, respectively, thereby transmittance of light passing through the liquid crystal layer is controlled by controlling the rearrangement of the liquid crystal molecules, and consequently an image is displayed.

Among the LCDs, an LCD in which two display panels are disposed and a thin film transistor ("TFT") switching the voltage applied to the electrodes is formed is widely used. One display panel (hereinafter also referred to as a TFT array panel) of the two display panels includes a plurality of wires such as a gate line and a data line, a pixel electrode formed in a pixel defined on the display panel, and a TFT controlling a data signal transmitted to the pixel electrode, and the other display panel (hereinafter also referred to as a color filter array panel) includes a black matrix having an opening corresponding to the pixel.

A spacer maintaining an interval between the TFT array panel and the color filter array panel is inserted therebetween to obtain a space in which the liquid crystal layer is formed.

The substrate spacer is classified into bead spacers that are spherical and have an irregular pattern, and column spacers or rigid spacers having a constant pattern.

The column spacers are formed by coating a photosensitive film on an opposing display panel and performing an exposure and development process on the coated photosensitive film so that it has a desired pattern corresponding to portions through which light does not transmit within pixels, such as at a channel part, gate lines, and storage electrode lines.

SUMMARY

A liquid crystal display ("LCD") has a problem that light leakage is generated. Accordingly, to prevent the light leakage, a black matrix is added to a position of column spacers to obtain and design a margin of the light leakage, but transmittance deterioration and a lattice stain caused by a reduction of an aperture ratio are generated.

The invention provides an LCD effectively preventing movement of a column spacer and suppressing light leakage by providing a fixing protrusion including a common electrode, a passivation layer, and a pixel electrode corresponding to a column spacer of a thin film transistor ("TFT") array panel, and a manufacturing method thereof.

An LCD according to an exemplary embodiment of the invention includes a first substrate, a second substrate facing the first substrate with a predetermined interval therebetween, a liquid crystal material filled between the first substrate and the second substrate, a column spacer disposed at the second substrate and maintaining the predetermined interval between the first substrate and the second substrate, a passivation layer disposed at the first substrate, a pixel electrode disposed on the passivation layer, and a fixing protrusion which is disposed on the first substrate, is positioned at an opposing surface of the column spacer and includes at least one of a lower layer in a same layer as the passivation layer and an upper layer in a same layer as the pixel electrode.

In an exemplary embodiment, the LCD may further include a common electrode disposed below the passivation layer where the fixing protrusion further include a lowest layer in a same layer as the common electrode under the lower layer in the same layer as the passivation layer.

In an exemplary embodiment, a gate conductor including a gate electrode may be disposed on the first substrate, and the fixing protrusion may be positioned on the gate electrode.

In an exemplary embodiment, a width of the fixing protrusion in a plan view may be in a range of about 1 micrometer (μm) to about 6 μm.

In an exemplary embodiment, a length of the fixing protrusion in the plan view may be in a range of about 1 μm to about 20 μm.

In an exemplary embodiment, a height of the fixing protrusion in a cross section may be in a range of about 500 angstrom (Å) to about 3500 Å.

In an exemplary embodiment, the fixing protrusion may include a triple layer including the lowest layer in the same layer as the common electrode, the lower layer in the same layer as the passivation layer, and the upper layer in the same layer as the pixel electrode.

In an exemplary embodiment, a height of the lowest layer of the fixing protrusion may be the same as a thickness of the common electrode of the LCD, a height of the lower layer of the fixing protrusion may be the same as a thickness of the passivation layer of the LCD, and a height of the upper layer of the fixing protrusion may be the same as a thickness of the pixel electrode of the LCD.

In an exemplary embodiment, boundaries of the common electrode, the passivation layer, and the pixel electrode in a cross section extend in a same line.

In an exemplary embodiment, the fixing protrusion may be provided in plural on the gate electrode, and the fixing protrusions are elongated in a diagonal direction with respect to the gate electrode.

In an exemplary embodiment, the plurality of fixing protrusions may be disposed with a rhombus shape.

An LCD according to another exemplary embodiment of the invention includes a first substrate, a second substrate facing the first substrate with a predetermined interval therebetween, a liquid crystal material filled between the first substrate and the second substrate, a column spacer disposed at the second substrate and maintaining the predetermined interval between the first substrate and the second substrate, a passivation layer disposed at the first substrate, a pixel electrode disposed on the passivation layer, a common electrode disposed below the passivation layer, and at least one fixing protrusion which is disposed on the first substrate, where the fixing protrusion is positioned at an opposing surface of the column spacer and includes at least one of a lower layer in a same layer as the pixel electrode, a middle layer in a same layer as the passivation layer, and an upper layer in a same layer as the common electrode.

In an exemplary embodiment, a gate conductor including a gate electrode may be disposed on the first substrate, where the fixing protrusion may be positioned on the gate electrode.

In an exemplary embodiment, the fixing protrusion may suppress movement of the column spacer in a diagonal direction.

In an exemplary embodiment, a width of the fixing protrusion in a plan view may be in a range of about 1 µm to about 6 µm.

In an exemplary embodiment, a length of the fixing protrusion in the plan view may be in a range of about 1 µm to about 20 µm.

In an exemplary embodiment, a height of the fixing protrusion in a cross section may be in a range of about 500 Å to about 3500 Å.

In an exemplary embodiment, the fixing protrusion may include a triple layer including the lower layer in the same layer as the pixel electrode, the middle layer in the same layer as the passivation layer, and the upper layer in the same layer as the common electrode, a height of the lower layer of the pixel electrode of the fixing protrusion may be the same as a thickness of the pixel electrode of the LCD, a height of the middle layer of the passivation layer may be the same as a thickness of the passivation layer of the LCD, and a thickness of the upper layer of the common electrode may be the same as a thickness of the common electrode of the LCD.

In an exemplary embodiment, boundaries of the common electrode, the passivation layer, and the pixel electrode in a cross section extend in a same line.

In an exemplary embodiment, the fixing protrusion may be provided in plural on the gate electrode, and a plurality of fixing protrusions may be elongated in a diagonal direction with respect to the gate electrode.

In an exemplary embodiment, the LCD according to the invention provides the fixing protrusion by using the common electrode, the passivation layer, and the pixel electrode in the manufacturing process of the TFT array panel such that the movement of the column spacer and the light leakage by the movement are prevented. Also, the column spacer is fixed such that an additional black matrix near the column spacer may be eliminated, thereby improving the aperture ratio and transmittance. When providing the fixing protrusion, an additional process and wiring are not used, and the fixing protrusion is simultaneously provided in the formation process of the common electrode, the passivation layer, and the pixel electrode such that the manufacturing method is simplified.

BRIEF DESCRIPTION OF THE DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1:
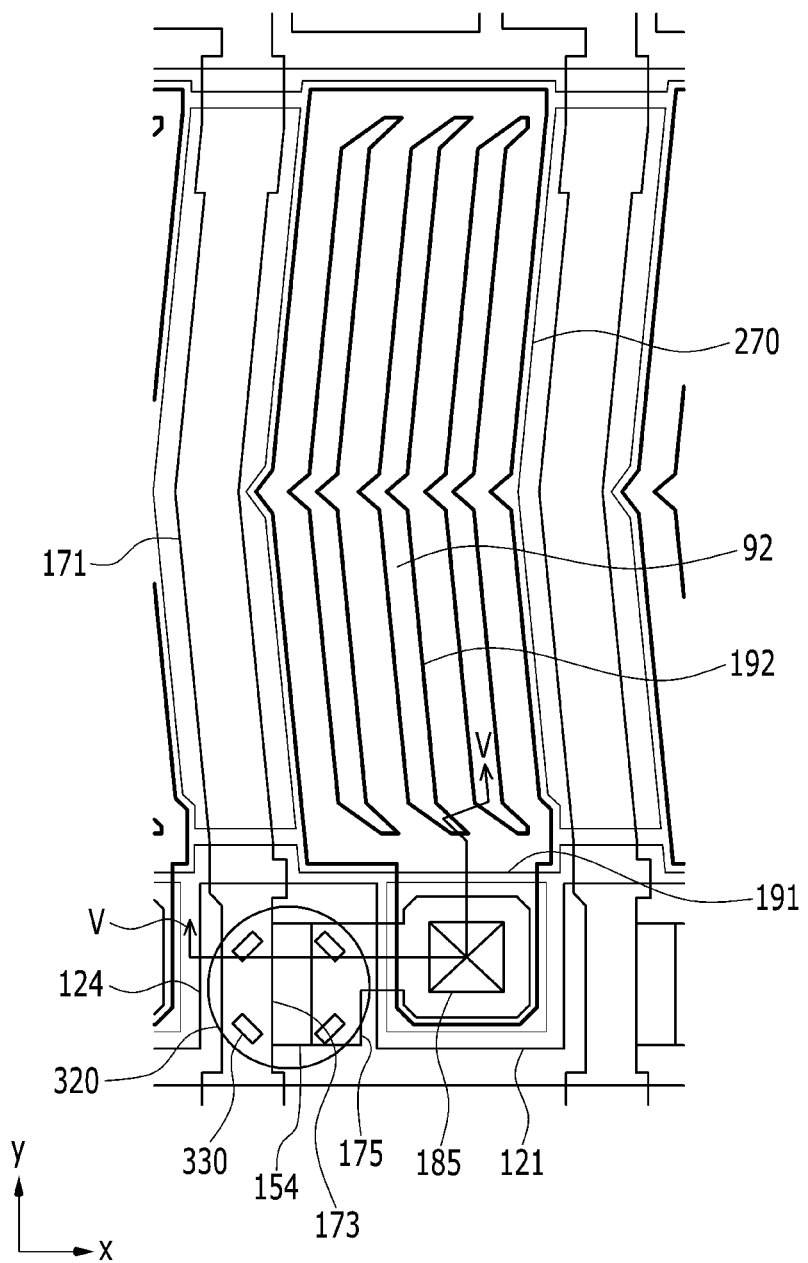
FIG. 1 is a plan view of an exemplary embodiment of a liquid crystal display ("LCD") according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Figure 2A:
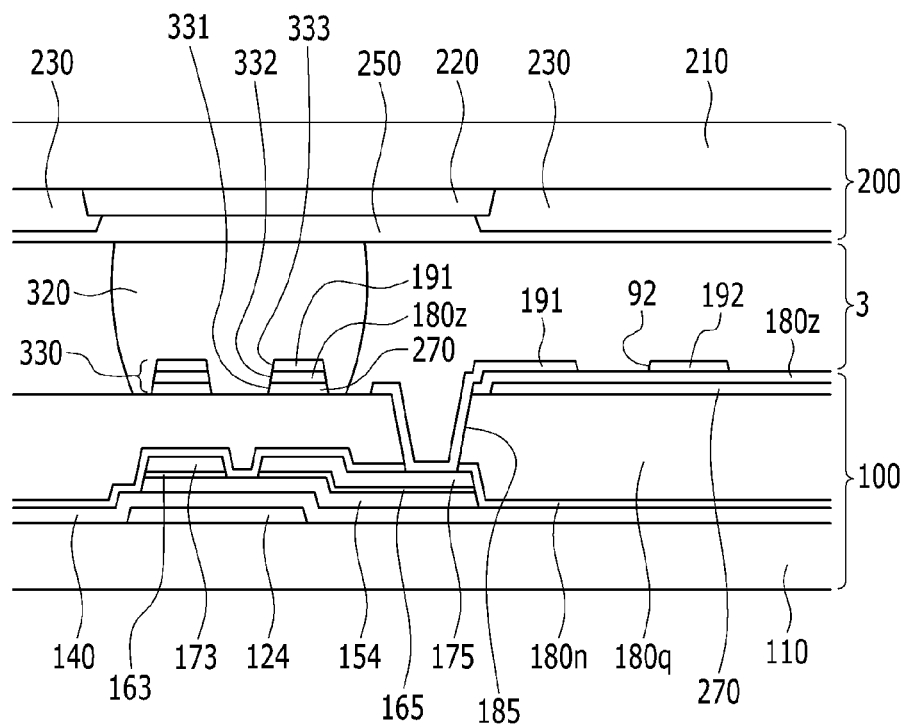
FIGS. 2A and 2B are cross-sectional views of the exemplary embodiment of the LCD shown in FIG. 1 taken along line V-V.
Figure 2B:
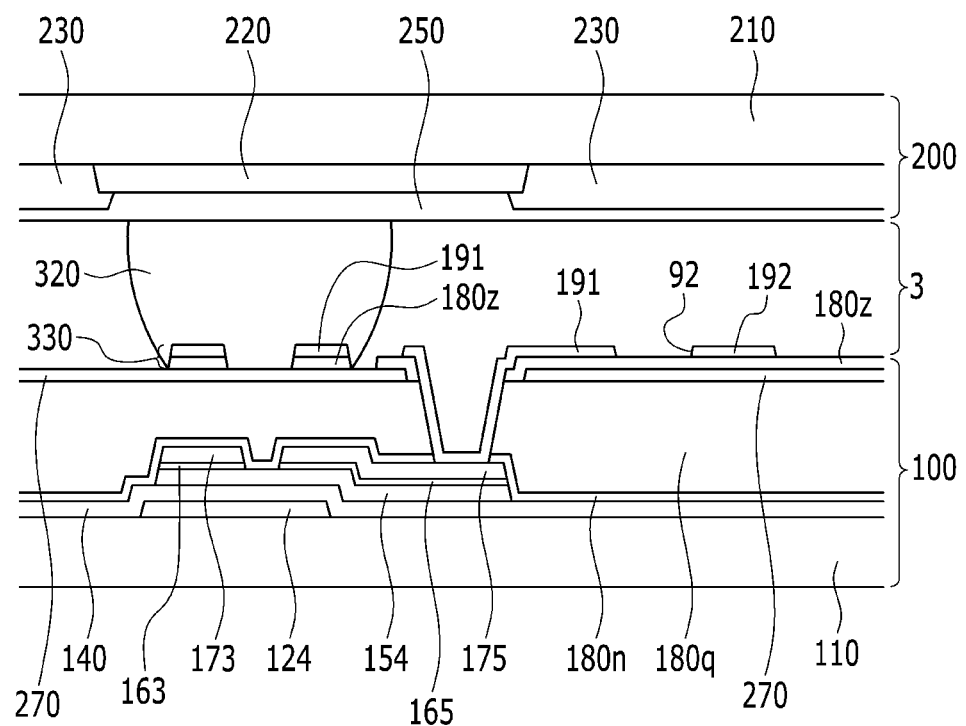
Figure 3:
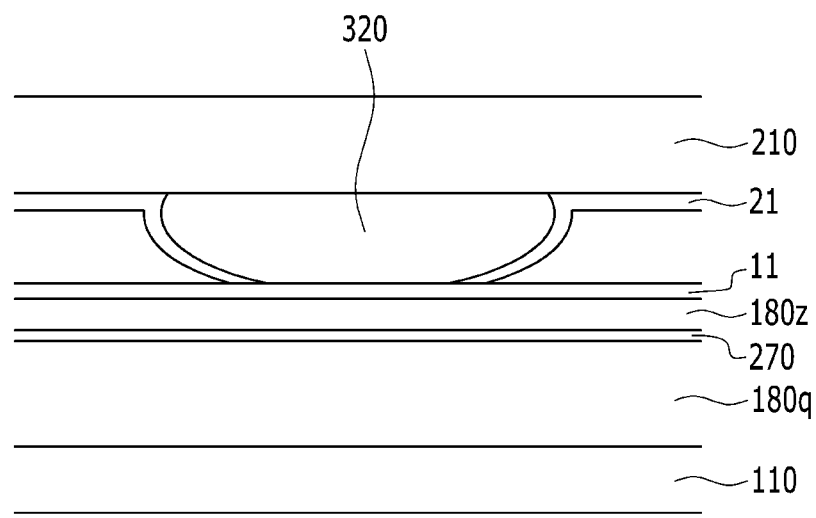
FIG. 3 is a schematic diagram of an LCD of a comparative example.
Figure 4A:
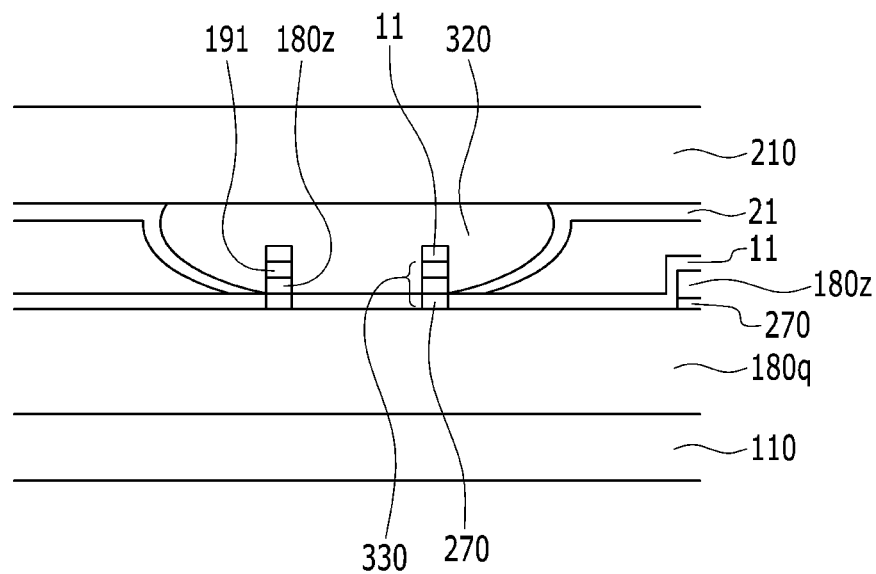
FIGS. 4A and 4B are schematic diagrams of an exemplary embodiment of an LCD according to the invention.
Figure 4B:
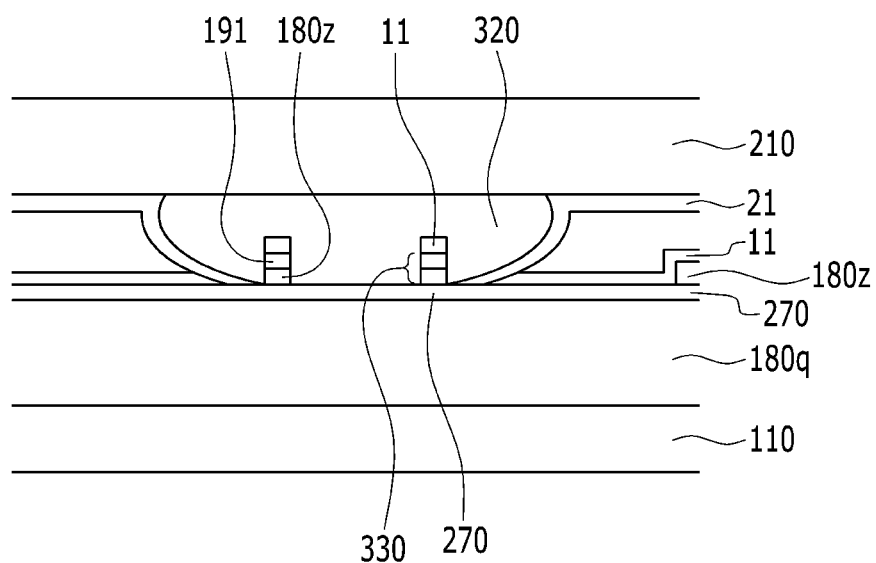

Next, a liquid crystal display ("LCD") according to an exemplary embodiment of the invention will be described with reference to FIGS. 1 to 4. FIG. 1 is a plan view of an LCD according to an exemplary embodiment of the invention, and FIGS. 2A and 2B are cross-sectional views of the LCD according to the exemplary embodiment shown in FIG. 1 taken along line V-V. FIGS. 4A and 4B are schematic diagrams of an LCD according to an exemplary embodiment of the invention.

Firstly, referring to FIG. 1 and FIGS. 2A and 2B, an LCD according to an exemplary embodiment of the invention includes a lower panel 100 and an upper panel 200 facing each other, and a liquid crystal layer 3 interposed therebetween.

Firstly, the lower panel 100 will be described.

A gate conductor including a gate line 121 is disposed on an insulating substrate 110 including transparent glass, plastics, or the like.

The gate line 121 includes a gate electrode 124, and a wide end portion (not shown) for connection with another layer or an external driving circuit. In an exemplary embodiment, the gate line 121 may include an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or molybdenum alloy, chromium (Cr), tantalum (Ta), titanium (Ti), or any combinations thereof. However, in another exemplary embodiment, the gate line 121 may have a multilayered structure including at least two conductive layers having different physical properties.

A gate insulating layer 140 including a silicon nitride (SiNx), a silicon oxide (SiOx), or the like is disposed on the gate conductor 121. However, in another exemplary embodiment, the gate insulating layer 140 may have a multilayered structure including at least two insulating layers having different physical properties.

A semiconductor 154 including amorphous silicon, polysilicon, or the like is disposed on the gate insulating layer 140. In an exemplary embodiment, the semiconductor 154 may include the oxide semiconductor.

Ohmic contacts 163 and 165 are disposed on the semiconductor 154. In an exemplary embodiment, the ohmic contacts 163 and 165 may include a material such as n+ hydrogenated amorphous silicon with which an n-type impurity such as phosphorus is doped at a high concentration, or of silicide. The ohmic contact 163 and 165 may be provided as a pair to be disposed on the semiconductor 154. In the case where the semiconductor 154 includes the oxide semiconductor, the ohmic contacts 163 and 165 may be omitted.

A data conductor including a data line 171 including a source electrode 173 and a drain electrode 175 is disposed on the ohmic contacts 163 and 165 and the gate insulating layer 140.

The data line 171 includes a wide end portion (not shown) for connection with another layer or an external driving circuit. The data line 171 transports a data signal and extends in a substantially vertical direction to cross the gate line 121.

In this case, the data line 171 may have a first bent portion having a bent shape in order to obtain maximum transmittance of the LCD. A second bent portion that is bent so as to provide a predetermined angle with the first bent portion may be further included in the pixel region in the plan view. The first and second bent portions may meet each other in a middle region of the pixel region to provide a V shape in a plan view.

The first bent portion of the data line 171 may be bent so as to provide an angle of about 7 degrees (°) with a vertical reference line y (reference line extending in a y direction) providing a 90° angle with an extension direction (x direction) of the gate line 121. The second bent portion may be further bent from the first bent portion at the middle region of the pixel region so as to provide an angle of about 7° to about 15° with the first bent portion.

The source electrode 173 is a portion of the data line 171, and is disposed on the same line as the data line 171. The drain electrode 175 is provided so as to extend in parallel with the source electrode 173. The drain electrode 175 is provided so as to extend in parallel with the source electrode 173.

The gate electrode 124, the source electrode 173, and the drain electrode 175 provide a thin film transistor ("TFT") in conjunction with the semiconductor 154, and a channel of the TFT is provided in the semiconductor 154 between the source electrode 173 and drain electrode 175.

In an exemplary embodiment, the data line 171 and the drain electrode 175 include refractory metal such as molybdenum, chromium, tantalum, and titanium, or an alloy thereof, and may have a multilayered structure including a refractory metal layer (not shown) and a low resistance conductive layer (not shown). Examples of the multilayered structure may include a double layer of a chromium or molybdenum (alloy) lower layer and an aluminum (alloy) upper layer, and a triple layer of a molybdenum (alloy) lower layer, an aluminum (alloy) middle layer, and a molybdenum (alloy) upper layer. However, the invention is not limited thereto, and the data line 171 and the drain electrode 175 may include various other metals or conductors in addition to this. In an exemplary embodiment, the width of the data line 171 may be about 3.5 micrometers (μm)±0.75 μm.

A first passivation layer 180n is disposed on exposed portions of the data conductors 171, 173 and 175, the gate insulating layer 140, and the semiconductor 154. The first passivation layer 180*n* may include an organic insulating material, an inorganic insulating material, or the like.

A second passivation layer 180*q* is disposed on the first passivation layer 180*n*. In an exemplary embodiment, the second passivation layer 180*q* may be omitted. In an exemplary embodiment, the second passivation layer 180*q* may be a color filter. In the case where the second passivation layer 180*q* is the color filter, the second passivation layer 180*q* may intrinsically display any one of primary colors, and examples of the primary colors may include three primary colors such as red, green, and blue, yellow, cyan, and magenta, or the like. Although not shown in the drawings, the color filter may further include a color filter displaying a mixed color of the primary colors or white in addition to the primary colors.

A common electrode 270 is disposed on the second passivation layer 180*q*.

In an exemplary embodiment, the common electrode 270 may have a surface shape and be disposed on the entire surface of the substrate 110 to have a whole plate shape, and may an opening may be defined in the common electrode 270 in a region corresponding to a circumference of the drain electrode 175. That is, other than the region corresponding to the drain electrode 175, the common electrode 270 may have a flat plate shape in which a cutout is not defined.

The liquid crystal display may include a plurality of common electrodes 270 respectively disposed in adjacent pixels and connected to each other to receive a common voltage having a predetermined size supplied from the outside of the display region.

In an exemplary embodiment, a part among the common electrode 270 may have a separated island shape on the gate electrode 124. The part among the common electrode 270 may be a portion including a same material as and in a same layer as a remainder of the common electrode 270. In FIGS. 2A and 4A, the part among the common electrode 270 is labeled with 270 for convenience of explanation. That is, another opening (not shown) defined in the common electrode 270 may be provided on the gate electrode and a portion of the common electrode 270 is provided as the separated island shape within the opening. In an exemplary embodiment, an area of the opening of the common electrode 270 on the gate electrode may be similar to or smaller than the area of the gate electrode 124. However, the opening of the common electrode 270 is positioned within a portion covered by the black matrix 220.

The common electrode 270 of the separated shape provides a portion of a fixing protrusion 330. In detail, the island common electrode provides a lower layer of the fixing protrusion 330. The island common electrode may be provided by a method of etching a material layer of the common electrode 270 through an appropriate mask when providing the common electrode 270. A width, a length, and an arrangement shape of the etched island common electrode are the same as those of the shape of the fixing protrusion 330. The width, the length, and the arrangement shape of the fixing protrusion 330 will be described later.

A fixing protrusion lower layer 331 is provided with the same process as the common electrode 270 such that a height d1 of the fixing protrusion lower layer 331 (refers to FIG. 16) is the same as a thickness of the common electrode 270. In an exemplary embodiment, the height of the fixing protrusion lower layer may be about 1000 angstrom (Å).

In another exemplary embodiment, the common electrode 270 may be provided as the entire plate without the etching of the opening and the island common electrode. At this time, the common electrode 270 does not provide the fixing protrusion, and a fixing protrusion of a dual layer or a single layer may be disposed on the common electrode 270.

FIGS. 2A and 4A are the cross-sectional views of the LCD when providing the fixing protrusion lower layer by etching a common electrode material layer in forming the common electrode 270, and FIGS. 2B and 4B are the cross-sectional views of the LCD when the common electrode material layer used to form the common electrode 270 is not etched such that the common electrode material layer does not provide a portion of the fixing protrusion. When the common electrode material layer used in forming the common electrode 270 is not etched, the fixing protrusion may include the dual layer of portions of materials layer forming the passivation layer and the pixel electrode. However, the invention is not limited thereto, and the fixing protrusion may include the single layer of the passivation layer or the pixel electrode. When common electrode material of the common electrode 270 does not provide a portion of the fixing protrusion lower layer, compared with a case that the common electrode material of the common electrode 270 provides the fixing protrusion lower layer, the height of the fixing protrusion in a cross section is reduced, but the manufacturing process may be simplified.

A third passivation layer 180*z* is disposed on the data conductors 171, 173, and 175, the gate insulating layer 140, the exposed portion of the semiconductor 154, the second passivation layer 180*q* and the common electrode 270. In an exemplary embodiment, the third passivation layer 180*z* may include the organic insulating material or the inorganic insulating material.

Among portions of the third passivation layer 180*z*, a portion of the third passivation layer 180*z* positioned on the gate electrode may be positioned on the island common electrode and may provide a middle layer 332 of the fixing protrusion 330. In FIGS. 2A and 4A, the part among the third passivation layer 180*z* is labeled with 180*z* for convenience of explanation. The portion of the third passivation layer 180*z* providing the middle layer 332 of the fixing protrusion 330 has the same shape as that of the part of fixing protrusion that is previously provided. When the fixing protrusion lower layer 331 in a same layer as the common electrode 270 is not provided, the third passivation layer 180*z* provides the fixing protrusion lower layer 331. When the fixing protrusion lower layer in a same layer as the common electrode 270 is not provided, the common electrode material of the common electrode 270 is not etched into the same shape as the fixing protrusion and is provided with the whole plate shape. The cross-section of the case where the fixing protrusion lower layer in a same layer as the common electrode 270 is not provided is shown in FIGS. 2B and 4B.

In exemplary embodiments, the fixing protrusion middle layer 332 may be provided by etching a material of the third passivation layer 180*z* by using the same mask as for the fixing protrusion lower layer after depositing the material of third passivation layer 180*z*, or may be provided by simultaneously etching the fixing protrusion lower layer (material of the common electrode 270) and the fixing protrusion middle layer (material of the third passivation layer 180*z*) by using one mask after depositing the materials for the common electrode 270 and the third passivation layer 180*z* on the gate electrode 124. When the material of the common electrode 270 does not provide the fixing protrusion lower layer, the fixing protrusion middle layer is provided by using the mask having the shape of the targeted fixing protrusion.

The fixing protrusion middle layer 332 is provided with the same process as the third passivation layer 180*z* such that the height d2 of the fixing protrusion is the same as the thickness of the third passivation layer 180z. In an exemplary embodiment, the height of the fixing protrusion middle layer 332 may be 2000 Å.

A pixel electrode 191 is disposed on the third passivation layer 180z. The pixel electrode 191 includes a curved edge that is almost parallel to the first bent portion and the second bent portion of the data line 171 in a plan view. A plurality of first cutouts 92 is defined in the pixel electrode 191 which includes a plurality of first branch electrodes 192 defined by the plurality of first cutouts 92.

A first contact hole 185 exposing the drain electrode 175 is defined in the first passivation layer 180n, the second passivation layer 180q, and the third passivation layer 180z. The pixel electrode 191 is physically and electrically connected to the drain electrode 175 through the first contact hole 185 to receive a voltage from the drain electrode 175.

A part of the material layer of the pixel electrode 191 may provide a fixing protrusion upper layer 333 while being positioned on the gate electrode 124. In FIGS. 2A and 4A, the part among the pixel electrode 191 is labeled with 191 for convenience of explanation. The part of the material of the pixel electrode 191 providing the upper layer 333 of the fixing protrusion 330 is positioned on portions of the fixing protrusion that are previously provided while having the same width and length of the portions of the fixing protrusion. The fixing protrusion upper layer 333 may be provided by etching a material layer of the pixel electrode 191 with the same shape as the fixing protrusion when providing the pixel electrode 191.

The fixing protrusion upper layer 333 may be provided by etching the material layer of the pixel electrode 191 after the deposition by using the same mask as for the fixing protrusion, and the fixing protrusion lower layer (material of the common electrode 270) and the fixing protrusion middle layer (material of the third passivation layer 180z) are disposed on the gate electrode 124. After depositing the fixing protrusion upper layer (material of the pixel electrode 191) material, they may be simultaneously etched through one mask. Also, when the common electrode 270 does not provide the fixing protrusion lower layer, after depositing the fixing protrusion middle layer and the fixing protrusion upper layer, these dual layers may be etched by using one mask.

The fixing protrusion upper layer 333 is provided by the same process as the pixel electrode 191 such that the height d3 of the fixing protrusion upper layer 333 is the same as the thickness of the pixel electrode 191. In an exemplary embodiment, the height of the fixing protrusion upper layer 333 may be about 500 Å.

An alignment layer 11 is coated on the pixel electrode 191 and the third passivation layer 180z, and the alignment layer may be a horizontal alignment layer and may be rubbed in a predetermined direction. However, the invention is not limited thereto, and according to the LCD according to another exemplary embodiment of the invention, the alignment layer may include a photoreactive material to be photo-aligned.

Next, the upper panel 200 will be described.

A light blocking member 220 is disposed on an insulation substrate 210. A plurality of color filters 230 is disposed on the substrate 210. In another exemplary embodiment, the color filters 230 may be disposed on the lower panel 100, and in this case, the light blocking member 220 may also be disposed in the lower panel 100.

An overcoat 250 is disposed on the color filter 230 and the light blocking member 220. In another exemplary embodiment, the overcoat 250 may be omitted.

In an exemplary embodiment, an alignment layer 21 may be disposed on the overcoat 250. The liquid crystal layer 3 includes a nematic liquid crystal material having positive dielectric anisotropy. The liquid crystal molecules of the liquid crystal layer 3 are arranged so that a long axis direction thereof is parallel to the display panels 100 and 200, and the liquid crystal layer has a twisted spiral structure where the direction thereof is 90° from the rubbing direction of the alignment layer of the lower display panel 100 to the upper display panel 200.

Between the lower panel 100 and the upper panel 200, a column spacer 320 uniformly maintaining the interval between the two display panels 100 and 200 and including and patterned of an insulating material supports the two display panels 100 and 200.

The column spacer 320 is positioned on the gate electrode 124. A plurality of fixing protrusions 330 is disposed at the lower panel 100 facing the column spacer 320. The column spacer 320 is pressed in an operation of combining the upper and the lower panels, and as shown in FIGS. 4A and 4B, the fixing protrusion 330 has the pressed shape. That is, as shown in FIG. 3, when the fixing protrusion 330 is omitted, the alignment layer 21 on the column spacer 320 and the alignment layer 11 on the lower substrate contact each other. An alignment force is eliminated by the contact of the alignment layers such that the light leakage may be generated. Also, the column spacer 320 is not separately fixed such that the light leakage may be generated by the movement of the column spacer 320 in a diagonal direction.

Figure 5:
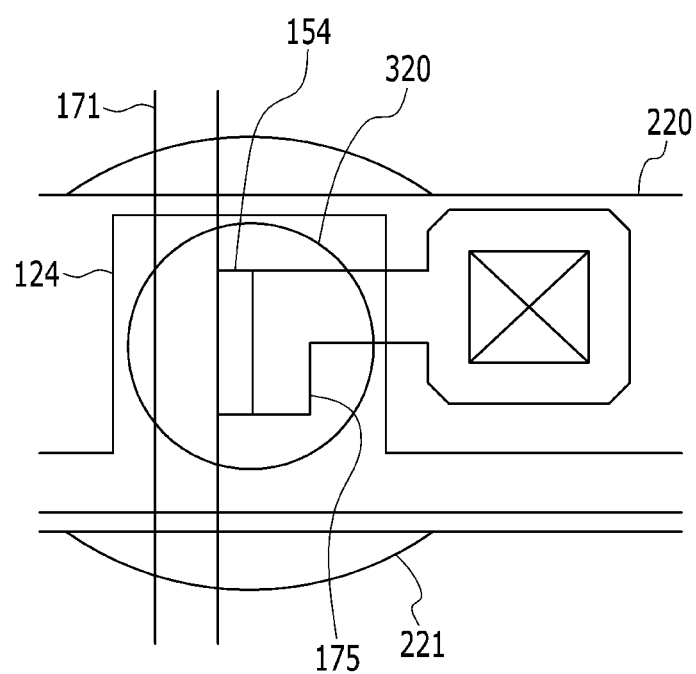
FIG. 5 is a view of an LCD of a comparative example.

FIG. 3 is a cross-sectional view of an LCD according to a comparative example. In the case of the LCD of the comparative example, to prevent the light leakage by the movement of the column spacer 320, as shown in FIG. 5, an additional black matrix 221 must be disposed near the column spacer 320.

Figure 6:
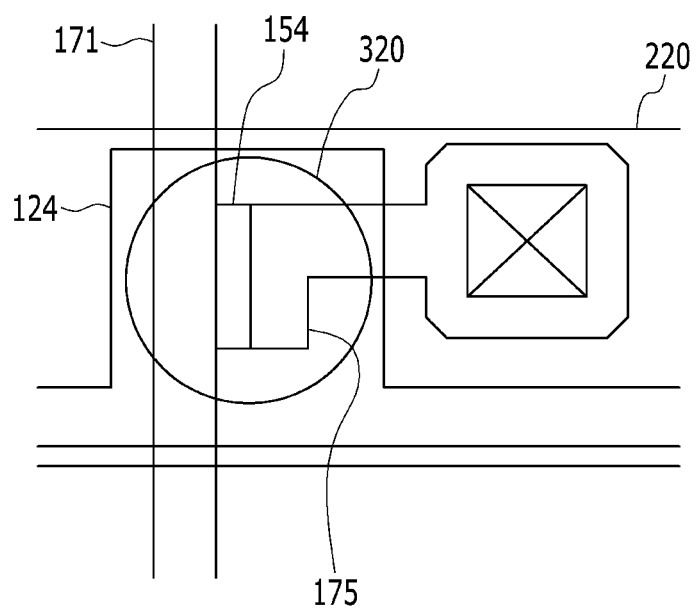
FIG. 6 is a view of an exemplary embodiment of an LCD according to the invention.

However, as shown in FIGS. 4A and 4B, when providing the fixing protrusion 330, the fixing protrusion 330 fixes the column spacer 320 and prevents the column spacer 320 from being moved. The fixing protrusion 330 extends to an inner area of the spacer 320 and a material of the spacer 320 may surround the fixing protrusion 330. Accordingly, as shown in FIG. 6, the additional black matrix is not necessary near the column spacer 320. Accordingly, in the LCD according to an exemplary embodiment of the invention, the area of the black matrix may be reduced, and thereby the aperture ratio may be improved.

The column spacer 320 positioned between the two display panels 100 and 200 is moved at the fixing position by the pressure of the upper and lower panels, and at this time, the column spacer 320 is substantially diagonally moved. This is the reason that the black matrix is disposed at the right and left of the column spacer 320 and the data conductor is disposed upward and downward thereof such that the movement of the column spacer 320 is partially suppressed, however a wire or an electrode suppressing the movement of the column spacer 320 is not positioned in the diagonal direction (e.g., inclined with respect to extension directions of the gate and data lines 121 and 171).

Figure 14:
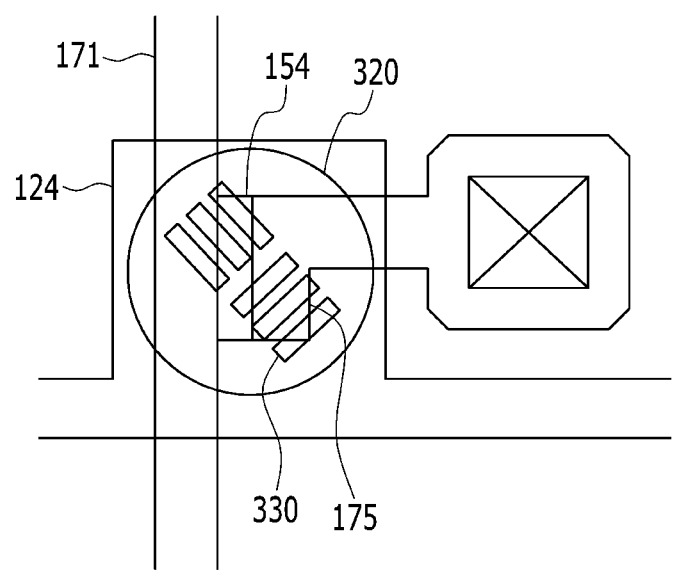
Figure 15:
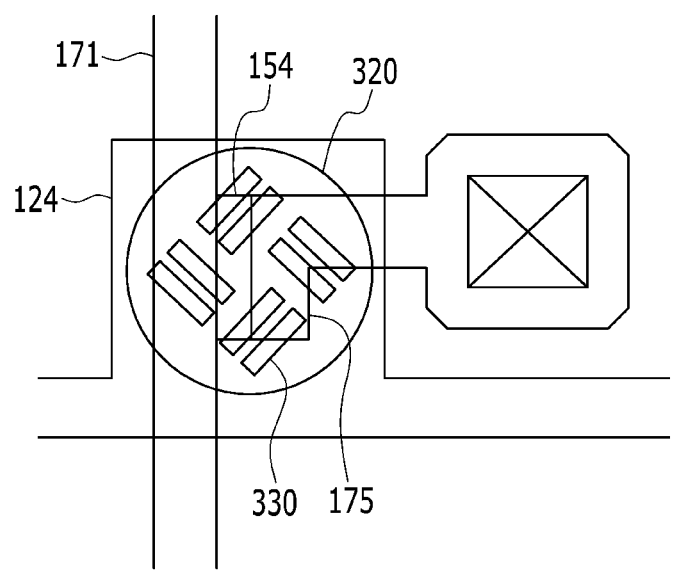

Accordingly, the light leakage by the movement of the column spacer 320 is generated in the substantially diagonal region. Therefore, the fixing protrusion 330 is disposed with a diagonal shape to suppress the movement of the column spacer 320 in the diagonal direction. Four or more fixing protrusions 330 may be disposed as shown in FIG. 1, each bar is disposed while having a rhombus shape in a plan view, and as shown in FIGS. 10 to 13, it may be disposed with various shapes. Also, as shown in FIGS. 14 and 15, more than four fixing protrusions 330 may be disposed.

Figure 16:
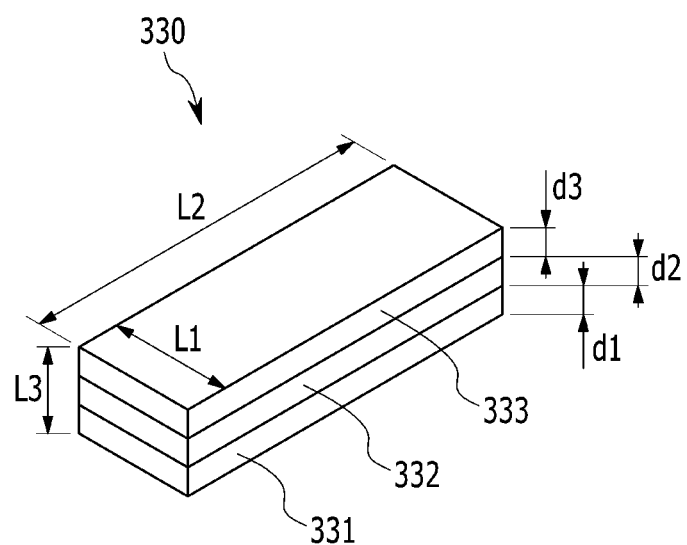
FIG. 16 is a view of an exemplary embodiment of one fixing protrusion according to the invention.

The shape of each fixing protrusion 330 may be the bar shape as shown in FIG. 16. In an exemplary embodiment, a width L1 of one fixing protrusion 330 in a plan view may be in a range of about 1 μm to about 6 μm. Preferably, the width L1 may be in the range of about 2 μm to about 5 μm. More preferably, the width L1 of one fixing protrusion 330 may be less than about 3 μm. The value range is a size that suppresses the movement of the column spacer 320 and simultaneously does not affect an arrangement of other wires and other electrodes of the entire TFT array panel.

In an exemplary embodiment, a length L2 of each fixing protrusion 330 in a plan view may be in a range of about 1 μm to about 20 μm. Preferably, the length L2 may be in the range of about 5 μm to about 15 μm. This is an appropriate value such that the fixing protrusion 330 is disposed between the black matrix and the contact hole on the gate electrode 124. In general, the length of the black matrix on the gate is about 22 μm such that the length of the fixing protrusion 330 must be smaller than this value. As described, the fixing protrusion 330 has the bar shape having the length that is longer than the width in a plan view such that it is appropriate to suppress the movement of the column spacer 320 in the diagonal direction.

A height L3 of each fixing protrusion 330 in a cross section may be in a range of about 500 Å to about 3500 Å. The fixing protrusion 330 is not provided through an additional process, but it is provided by partially depositing and etching material layers of the common electrode 270, the passivation layer and/or the pixel electrode 191 when providing the common electrode 270, the passivation layer, and the pixel electrode 191 such that the height of the fixing protrusion 330 is the same as the sum of the heights of the common electrode 270, the passivation layer, and the pixel electrode 191. The fixing protrusion 330 may be provided by depositing all material layers of the common electrode 270, the passivation layer, and the pixel electrode 191, or may be provided by depositing less than all of the material layers of the common electrode 270, the passivation layer, and the pixel electrode 191. Respective layers of the fixing protrusion 330 may be in the same layer as the common electrode 270, the passivation layer and the pixel electrode 191, since the layers of the fixing protrusion 330 include a same material as that of the common electrode 270, the passivation layer and/or the pixel electrode 191.

The fixing protrusion 330 may be disposed at least on the opposing portion of the column spacer 320 of the lower panel, that is, on the gate electrode. At this time, a group shape of the fixing protrusion 330 is not limited thereto, however, to suppress the movement of the column spacer 320 in the diagonal direction, the group shape of the fixing protrusion 330 may be the rhombus shape or similar in a plan view. That is, the shape is longer in the diagonal direction than a cross direction. Examples of the group shape of the fixing protrusion 330 are shown in FIGS. 10 to 15, but the invention is not limited thereto.

The fixing protrusion 330 may be provided by separately etching materials the lower layer, the middle layer, or the upper layer after depositing them, or may be provided by entirely etching materials the lower layer, the middle layer, and the upper layer material by using one mask after depositing all of them. When performing the etching by using one mask, the manufacturing process may be simplified.

Figure 7:
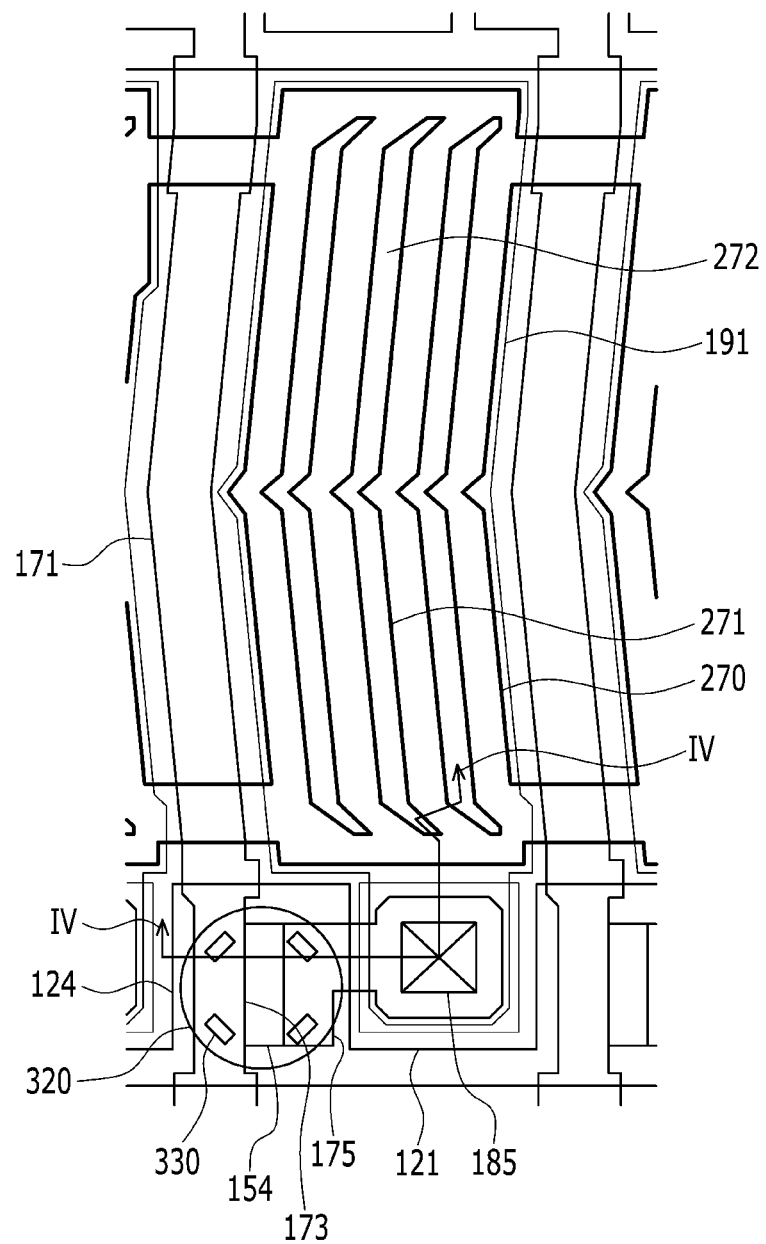
FIG. 7 is a plan view of another exemplary embodiment of an LCD according to the invention.
Figure 8:
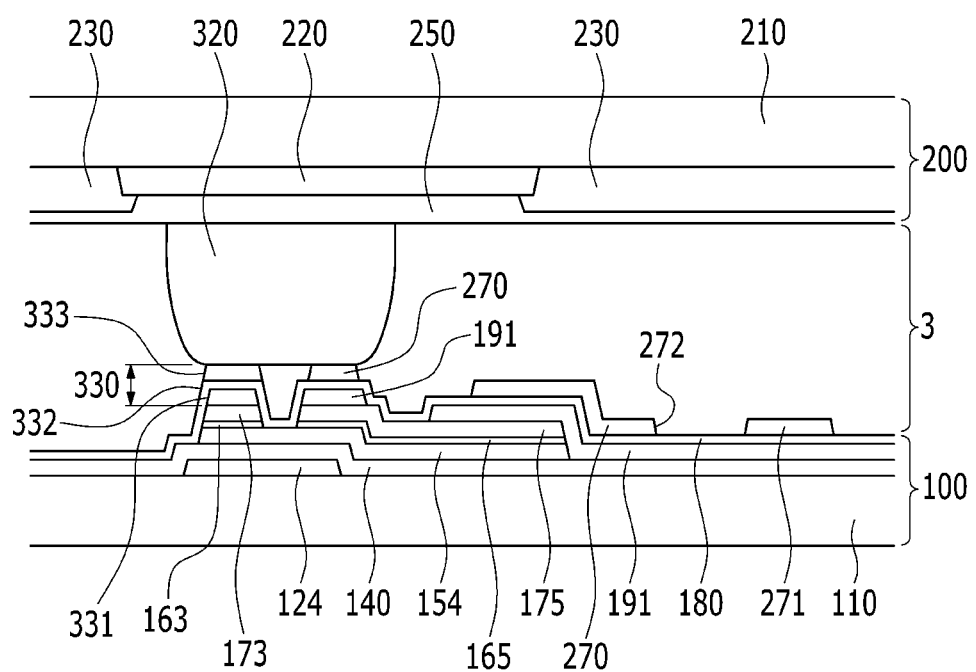
FIGS. 8 and 9 are cross-sectional views of the exemplary embodiment of the LCD shown in FIG. 7 taken along line IV-IV.
Figure 9:
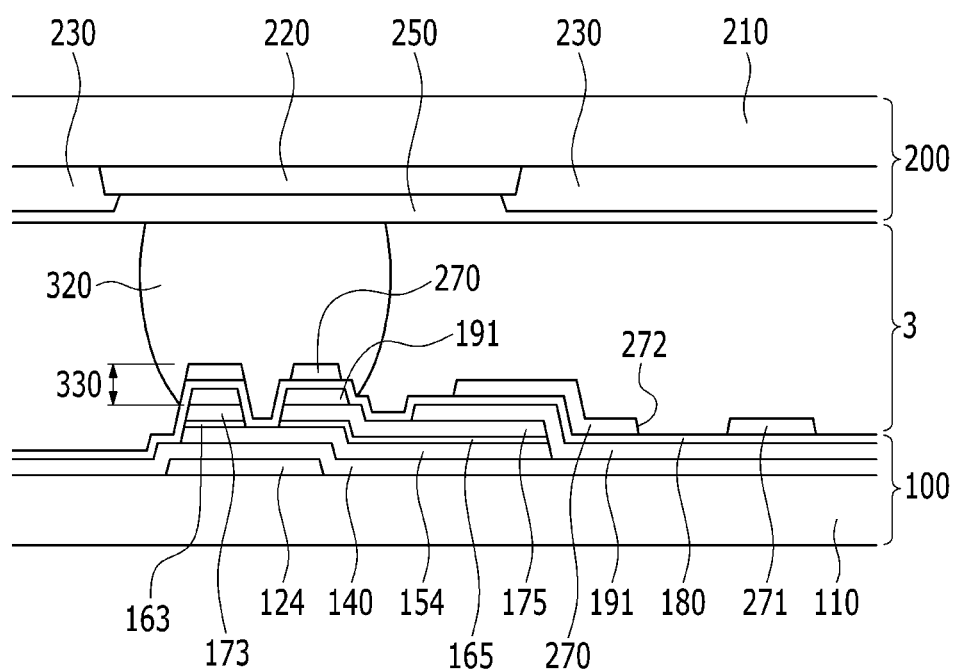
Figure 10:
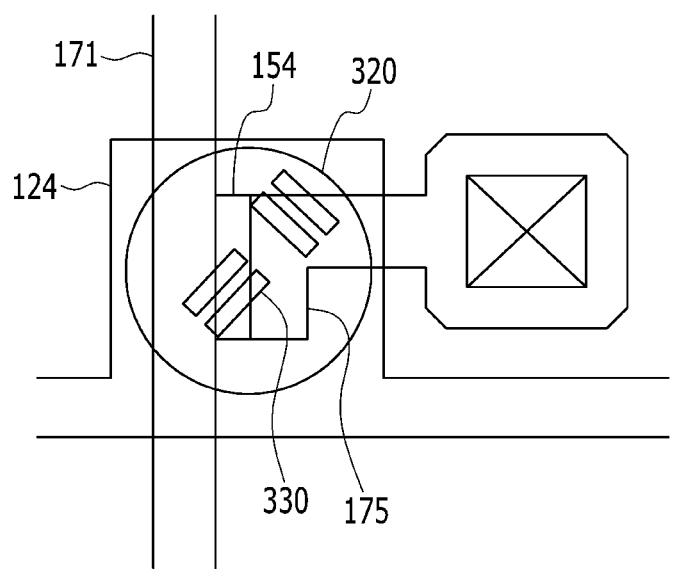
FIGS. 10 to 15 are views of another exemplary embodiment of a fixing protrusion and a column spacer of an LCD according to the invention.
Figure 11:
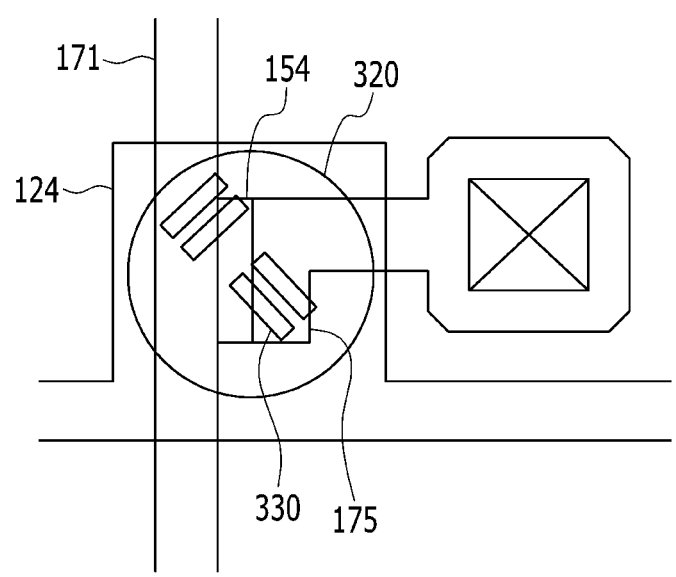
Figure 12:
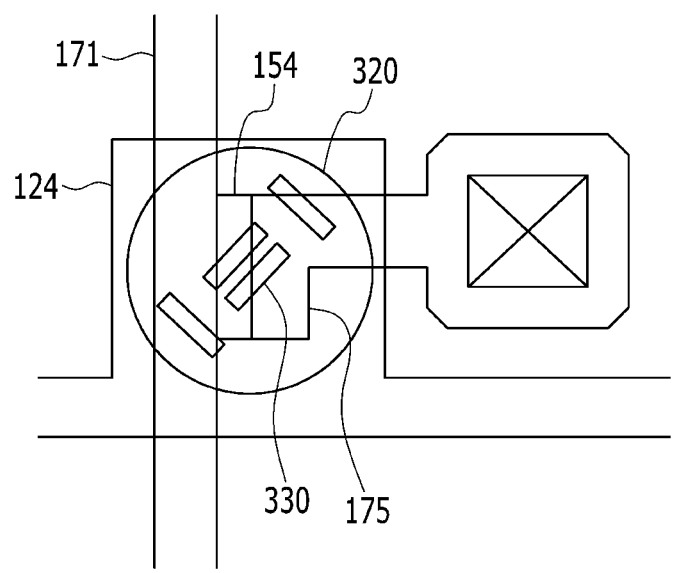
Figure 13:
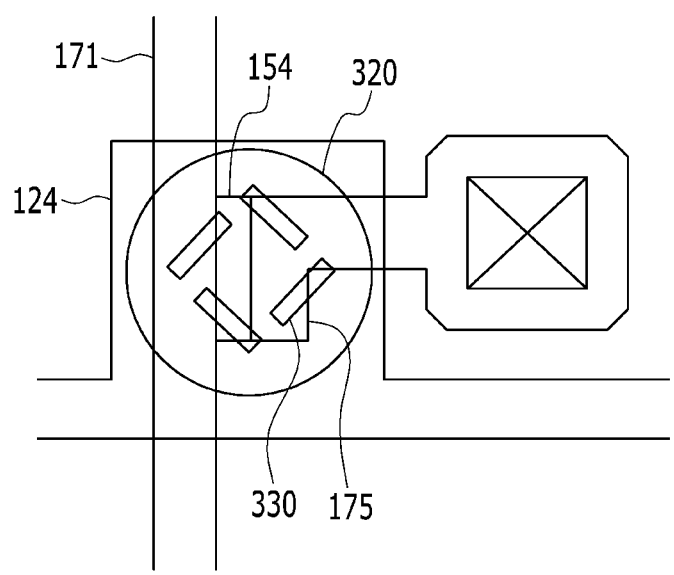

Next, an LCD according to another exemplary embodiment of the invention will be described with reference to FIGS. 7 to 9. FIG. 7 is a plan view of an LCD according to another exemplary embodiment of the invention, and FIG. 8 is a cross-sectional view of the LCD according to the exemplary embodiment including the TFT array panel shown in FIG. 7 taken along line IV-IV. FIG. 9 as a cross-sectional view of FIG. 8 shows a shape for fixing a column spacer 320 by a fixing protrusion 330.

Referring to FIGS. 7 and 8, an LCD according to the exemplary embodiment is similar to the LCD according to the exemplary embodiment shown in FIGS. 1 and 2.

Firstly, the lower panel 100 will be described.

A gate conductor including the gate line 121 is disposed on an insulating substrate 110.

A gate insulating layer 140 including a silicon nitride (SiNx), a silicon oxide (SiOx) or the like is disposed on the gate conductor 121.

A semiconductor 154 is disposed on the gate insulating layer 140.

Ohmic contacts 163 and 165 are disposed on the semiconductor 154. In the case where the semiconductor 154 is the oxide semiconductor, the ohmic contacts 163 and 165 may be omitted.

A data conductor including a data line 171 including a source electrode 173 and a drain electrode 175 is disposed on the ohmic contacts 163 and 165 and the gate insulating layer 140.

A pixel electrode 191 is disposed directly on the drain electrode 175. The pixel electrode 191 is disposed in one pixel region to have a surface shape, that is, a plate shape. At this time, a portion of the pixel electrode 191 is separated on the gate electrode 124 to be provided with the island shape. That is, the opening (not shown) defined on the gate electrode is defined in the pixel electrode 191 of the plate shape and the portion of the pixel electrode 191 is provided as the separated island shape within the opening. An area of the opening of the pixel electrode 191 on the gate electrode may be similar to or smaller than the area of the gate electrode. However, the opening of the pixel electrode 191 is positioned within a portion covered by the black matrix.

The separated island pixel electrode provides the fixing protrusion 330.

The shape of the separated island pixel electrode, as shown in FIG. 7, may be a four bar shape that is positioned at each edge of the gate electrode on the diagonal in a plan view. The formation position of the island pixel electrode may be on the source electrode 173 and the drain electrode 175, however it may be positioned on the gate electrode or the semiconductor channel region outside the source electrode 173 or the drain electrode 175.

In detail, the island pixel electrode provides the lower layer 331 of the fixing protrusion 330. The island pixel electrode may be provided by the method of etching the common electrode 270 through the predetermined mask when providing the pixel electrode 191. The width, length, and arrangement of the etched island pixel electrode are the same as those of the fixing protrusion 330. The width, length, and arrangement of the fixing protrusion 330 are the same as the description in the exemplary embodiment in FIGS. 1 to 4. The fixing protrusion lower layer 331 is provided with the same process as the pixel electrode 191 such that the height d1 of the fixing protrusion lower layer 331 is the same as the thickness of the pixel electrode 191. In an exemplary embodiment, the height of the fixing protrusion lower layer may be about 500 Å.

The separated island pixel electrode that is simultaneously provided when providing the pixel electrode 191 provides the lower layer of the fixing protrusion 330 and the shape of the separated island pixel electrode is the shape of the fixing protrusion 330, thereby the separated island pixel electrode may have a shape with a width of about 1 μm to about 6 μm, more preferably about 2 μm to about 5 μm, and the length of about 1 μm to about 20 μm, more preferably about 5 μm to about 15 μm. There may be at least one separated island pixel electrode, and preferably four or more. When the fixing protrusion 330 includes the single layer of the pixel electrode 191, the height of the fixing protrusion 330 may be about 500 Å.

A passivation layer 180 is disposed on the data conductors 171, 173, and 175, the gate insulating layer 140, the exposed portion of the semiconductor 154, and the pixel electrode 191. However, in the LCD according to another exemplary embodiment of the invention, the passivation layer 180 may be disposed between the pixel electrode 191 and the data line 171, and the pixel electrode 191 may be connected through a contact hole (not shown) defined in the passivation layer 180 to the drain electrode 175.

The passivation layer 180 positioned on the gate electrode is disposed on the island pixel electrode, thereby providing the middle layer 332 of the fixing protrusion 330. When the fixing protrusion lower layer 331 does not include the pixel electrode 191, the passivation layer 180 provides the fixing protrusion lower layer 331.

A part of the passivation layer 180 is disposed on the separated island pixel electrode and provides the middle layer 332 of the fixing protrusion 330. The width, length, and arrangement shape of the fixing protrusion middle layer 332 including the passivation layer 180 are the same as those of the lower layer 331 of the fixing protrusion 330. The height of the fixing protrusion middle layer is the same as the height of the passivation layer 180. In an exemplary embodiment, the height of the fixing protrusion middle layer may be about 2000 Å. When the lower layer 331 of the fixing protrusion 330 does not exist, the passivation layer 180 may be patterned with the predetermined shape thereby being as the lower layer 331 of the fixing protrusion 330.

That is, when the fixing protrusion lower layer 331 including the separated island pixel electrode is provided, the middle layer 332 of the passivation layer 180 is disposed on the fixing protrusion lower layer 331 including the island pixel electrode, however when the fixing protrusion lower layer 331 including the pixel electrode does not exist, the passivation layer 180 are patterned with the predetermined shape in the deposition process. As described above, when the passivation layer 180 includes the lower layer 331 of the fixing protrusion 330, the shape having the width of about 1 μm to about 6 μm, preferably about 2 μm to about 5 μm, and the length of about 1 μm to about 20 μm, preferably about 5 μm to about 15 μm, is provided.

The common electrode 270 is disposed on the portion of the passivation layer 180. Common electrodes 270 are connected to each other to receive the reference voltage from the reference voltage application portion disposed outside of the display area.

The common electrode 270 includes a curved edge that is almost parallel to the first bent portion and the second bent portion of the data line 171 in a plan view, and the common electrodes 270 disposed in the adjacent pixels are connected to each other. A plurality of second cutouts 272 is defined in the common electrode 270 which includes a plurality of second branch electrodes 271 defined by the plurality of second cutouts 272.

A portion of the common electrode 270 is positioned on the gate electrode and may provide the fixing protrusion upper layer 333. The common electrode 270 providing the upper layer 333 of the fixing protrusion 330 has the same width and length as the provided fixing protrusion 330, and is positioned on the provided fixing protrusion 330. The fixing protrusion upper layer 333 may be provided by etching the common electrode 270 with the same shape as the width and the length of the provided fixing protrusion 330 when providing the common electrode 270.

The fixing protrusion upper layer 333 may be provided by etching the common electrode 270 by using the same mask as for the provided fixing protrusion 330 after the deposition, or by etching the fixing protrusion lower layer (the pixel electrode 191) and the fixing protrusion middle layer 332 (the passivation layer 180) after depositing them on the gate electrode. After depositing the fixing protrusion upper layer 333 (the common electrode 270), the fixing protrusion 330 may be provided by simultaneously etching it together with the common electrode 270 by using one mask.

The fixing protrusion upper layer 333 is provided by the same process as that of the common electrode 270 such that the height d3 of the fixing protrusion upper layer 333 is the same as the thickness of the common electrode 270. In an exemplary embodiment, the height of the fixing protrusion upper layer 333 may be about 1000 Å.

When the fixing protrusion lower layer or middle layer 332 does not exist, the portion of the common electrode 270 is patterned with the predetermined shape thereby provided as the fixing protrusion 330. That is, when the fixing protrusion 330 includes the single layer of the common electrode 270, the common electrode 270 is patterned with the shape having the width of about 1 μm to about 6 μm, preferably about 2 μm to about 5 μm, and the length of about 1 μm to about 20 μm, preferably about 5 μm to about 15 μm, to provide the fixing protrusion 330.

The alignment layer may be coated on the common electrode 270 and the passivation layer 180, may be a horizontal alignment layer, and may be rubbed in a predetermined direction. However, in the LCD according to another exemplary embodiment of the invention, the alignment layer may include an optical reaction material to be optically aligned. The alignment layer may cover the provided fixing protrusion 330.

Now, the upper display panel 200 will be described.

The light blocking member 220 is disposed on the insulating substrate 210. A plurality of color filters 230 is disposed on the substrate 210. The color filters 230 may be disposed on the lower panel 100, and in this case, the light blocking member 220 may also be disposed in the lower panel 100.

The overcoat 250 is disposed on the color filter 230 and the light blocking member 220. The overcoat 250 may be omitted.

The alignment layer may be disposed on the overcoat 250. The liquid crystal layer 3 includes a nematic liquid crystal material having positive dielectric anisotropy. The liquid crystal molecules of the liquid crystal layer 3 are arranged so that a long axis direction thereof is parallel to the display panels 100 and 200, and the liquid crystal layer has a twisted spiral structure where the direction thereof is 90° from the rubbing direction of the alignment layer of the lower display panel 100 to the upper display panel 200.

Between the lower panel 100 and the upper panel 200, a column spacer 320 maintaining the interval between two display panels 100 and 200 and including the insulating material supports the two display panels 100 and 200.

The column spacer 320 is positioned on the gate electrode 124. The lower panel 100 facing the column spacer 320 includes a plurality of fixing protrusions 330. The column spacer 320 is pressed in the combination process of the two display panels 100 and 200, and as shown in FIG. 9, the fixing protrusion 330 has the pressed shape. The fixing protrusion 330 fixes the column spacer 320 and prevents the movement of the column spacer 320.

The fixing protrusion 330 may be provided in plural, and may include four bar shapes positioned at each edge of the gate electrode in the diagonal direction. The formation position of the fixing protrusion 330 may be on the source electrode 173 and the drain electrode 175, however it may be on the gate electrode or the semiconductor channel region outside the source electrode 173 or the drain electrode 175. However, the formation position of the fixing protrusion 330 is not deviated from the region covered by the black matrix on the gate electrode.

The shape of one fixing protrusion 330 is shown in FIG. 16. The width L1 of one fixing protrusion 330 may be in the range of about 1 µm to about 6 µm, and preferably about 2 µm to about 5 µm. The length L2 of the fixing protrusion may be in the range of about 1 µm to about 20 µm, and preferably about 5 µm to about 15 µm.

The fixing protrusion 330 may include the pixel electrode lower layer 331 having a height d1, the middle layer 332 having a height d2 of the passivation layer 180, and the upper layer 333 having a height d3 of the common electrode 270. The height of the fixing protrusion 330 may be about 500 Å to about 3500 Å. The fixing protrusion 330 may only include one of the pixel electrode lower layer, the middle layer 332 of the passivation layer 180, and the upper layer of the common electrode 270, or at least two.

The fixing protrusion 330 includes the diagonal shape to suppress the movement of the column spacer 320 of the diagonal direction. The fixing protrusion 330 may be one among the shapes shown in FIGS. 10 to 15, but the invention is not limited thereto.

What is claimed is:

1. A liquid crystal display comprising:
   a first substrate;
   a second substrate facing the first substrate with a predetermined interval therebetween;
   a liquid crystal material between the first substrate and the second substrate;
   a column spacer disposed at the second substrate and maintaining the predetermined interval between the first substrate and the second substrate;
   a passivation layer disposed at the first substrate;
   a pixel electrode disposed on the passivation layer; and
   a fixing protrusion which is disposed on the first substrate, is positioned at an opposing surface of the column spacer,
   wherein the fixing protrusion includes a lower payer comprising the same layer as the passivation layer and an upper layer comprising the same layer as the pixel electrode on the lower later, and
   wherein a width of the lower layer is substantially equal to a width of the upper layer.

2. The liquid crystal display of claim 1, further comprising:
   a common electrode disposed below the passivation layer,
   wherein the fixing protrusion further includes a lowest layer comprising the same layer as the common electrode and under the lower layer in the same layer as the passivation layer.

3. The liquid crystal display of claim 2, wherein
   a height of the lowest layer of the fixing protrusion is the same as a thickness of the common electrode of the liquid crystal display,
   a height of the lower layer of the fixing protrusion is the same as a thickness of the passivation layer of the liquid crystal display,
   a height of the upper layer of the fixing protrusion is the same as a thickness of the pixel electrode of the liquid crystal display.

4. The liquid crystal display of claim 3, wherein
   boundaries of the common electrode, the passivation layer, and the pixel electrode in a cross section extend in a same line.

5. The liquid crystal display of claim 1, further comprising
   a gate conductor including a gate electrode on the first substrate, and the fixing protrusion is positioned on the gate electrode.

6. The liquid crystal display of claim 5, wherein:
   the fixing protrusion is provided in plural on the gate electrode, and the fixing protrusions are elongated in a diagonal direction with respect to the gate electrode.

7. The liquid crystal display of claim 6, wherein
   a plurality of fixing protrusions has a rhombus shape in a plan view.

8. The liquid crystal display of claim 1, wherein
   a width of the fixing protrusion in a plan view is in a range of about 1 micrometer to about 6 micrometers.

9. The liquid crystal display of claim 1, wherein
   a length of the fixing protrusion in a plan view is in a range of about 1 micrometer to about 20 micrometers.

10. The liquid crystal display of claim 1, wherein
    a height of the fixing protrusion in a cross section is in a range of about 500 angstrom to about 3500 angstrom.

11. A liquid crystal display comprising:
    a first substrate;
    a second substrate facing the first substrate with a predetermined interval therebetween;
    a liquid crystal material between the first substrate and the second substrate;
    a column spacer disposed at the second substrate and maintaining the predetermined interval between the first substrate and the second substrate;
    a passivation layer disposed at the first substrate;
    a pixel electrode disposed on the passivation layer;
    a common electrode disposed below the passivation layer; and
    a fixing protrusion which is disposed on the first substrate, is positioned at an opposing surface of the column spacer,
    wherein the fixing protrusion includes a lower layer comprising the same layer as the pixel electrode, a middle layer comprising the same layer as the passivation layer on the lower layer and an upper layer comprising the same layer as the common electrode on the middle layer, and
    wherein a width of the lower layer is substantially equal to a width of the middle layer and a width of the upper layer.

12. The liquid crystal display of claim 11, further comprising
    a gate conductor including a gate electrode disposed on the first substrate, wherein the fixing protrusion is positioned on the gate electrode.

13. The liquid crystal display of claim 12, wherein
    the fixing protrusion suppresses movement of the column spacer in a diagonal direction.

14. The liquid crystal display of claim 12, wherein
    the fixing protrusion is provided in plural on the gate electrode, and a plurality of fixing protrusions is elongated in a diagonal direction with respect to the gate electrode.

15. The liquid crystal display of claim 11, wherein
    a width of the fixing protrusion in a plan view is in a range of about 1 micrometer to about 6 micrometers.

16. The liquid crystal display of claim 11, wherein
    a length of the fixing protrusion in a plan view is in a range of about 1 micrometer to about 20 micrometers.

17. The liquid crystal display of claim 11, wherein a height of the fixing protrusion in a cross section is in a range of about 500 angstrom to about 3500 angstrom.

18. The liquid crystal display of claim 11, wherein
a height of the lower layer of the fixing protrusion is the same as a thickness of the pixel electrode of the liquid crystal display,
a height of the middle layer of the fixing protrusion is the same as a thickness of the passivation layer of the liquid crystal display, and
a thickness of the upper layer of the fixing protrusion is the same as a thickness of the common electrode of the liquid crystal display.

19. The liquid crystal display of claim 18, wherein boundaries of the common electrode, the passivation layer, and the pixel electrode in a cross section extend in a same line.

\* \* \* \* \*